(12) United States Patent
Hutzel

(10) Patent No.: US 6,672,637 B2
(45) Date of Patent: Jan. 6, 2004

(54) ADDED UTILITY AUTOMOTIVE GLAZING

(75) Inventor: Barry W. Hutzel, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 10/106,155

(22) Filed: Mar. 26, 2002

(65) Prior Publication Data

US 2002/0158490 A1 Oct. 31, 2002

Related U.S. Application Data (60) Provisional application No. 60/278,895, filed on Mar. 26, 2001.

(51) Int. Cl.$^7$ .................................................. B60P 3/00
(52) U.S. Cl. ........................ 296/3; 296/197; 296/146.15; 224/545; 224/546
(58) Field of Search ................................. 296/196, 197, 296/146.15, 3, 218, 152; 224/545, 546

(56) References Cited

U.S. PATENT DOCUMENTS

| | | | | |
|---|---|---|---|---|
| 2,797,851 A | * | 7/1957 | Leake | |
| 4,231,501 A | * | 11/1980 | Goode | |
| 4,364,214 A | | 12/1982 | Morgan et al. | 52/311 |
| 4,364,595 A | | 12/1982 | Morgan et al. | 296/84 |
| 4,396,221 A | | 8/1983 | Morgan et al. | 296/84 |
| 4,450,989 A | * | 5/1984 | Bogar, Jr. | |
| 5,390,837 A | * | 2/1995 | Ruffolo, Jr. | |
| 5,475,956 A | | 12/1995 | Agrawal et al. | 52/208 |
| 5,551,197 A | | 9/1996 | Repp et al. | 52/204.62 |
| 5,614,051 A | | 3/1997 | Fisher et al. | 156/245 |
| 5,635,281 A | | 6/1997 | Agrawal | 428/192 |
| 5,704,173 A | | 1/1998 | Repp et al. | 52/204.62 |
| 5,804,018 A | | 9/1998 | Fisher et al. | 156/245 |
| 5,966,874 A | | 10/1999 | Repp et al. | 49/398 |
| 6,019,411 A | | 2/2000 | Carter et al. | 296/37.7 |
| 6,030,105 A | | 2/2000 | Thau et al. | 362/488 |
| 6,086,138 A | | 7/2000 | Xu et al. | 296/146.15 |
| 6,116,678 A | * | 9/2000 | Beck | |
| 6,120,274 A | | 9/2000 | Gerig et al. | 425/116 |
| 6,128,860 A | | 10/2000 | Repp et al. | 49/398 |
| 6,231,111 B1 | | 5/2001 | Carter et al. | 296/146.15 |
| 6,293,609 B1 | | 9/2001 | Xu et al. | 296/146.15 |
| 6,319,344 B1 | | 11/2001 | Lewno | 156/108 |

* cited by examiner

Primary Examiner—Dennis H. Pedder
Assistant Examiner—Jason Morrow
(74) Attorney, Agent, or Firm—Van Dyke, Gardner, Linn & Burkhart, LLP

(57) ABSTRACT

A vehicular window system includes a window assembly that is adapted to be mounted in an opening of a vehicle. The window assembly includes at least one window panel and a mounting member, which is fixedly attached to a surface of the window panel. The window assembly further preferably includes an attachment member, which is attached to the mounting member.

15 Claims, 7 Drawing Sheets

FIG.14 ary W. Hutzel, the disclosure of which is incorporated
ADDED UTILITY AUTOMOTIVE GLAZING This application claims priority from U.S. provisional Pat. application Ser. No. 60/278,895, filed Mar. 26, 2001, entitled ADDED UTILITY AUTOMOTIVE GLAZING, by Barry W. Hutzel, the disclosure of which is incorporated herein by reference in its entirety.

TECHNICAL FIELD AND BACKGROUND OF THE INVENTION

The present invention is generally directed to automotive glazing and, more particularly, to added utility automotive glazings.

With increasing demand for non-driving related activities in or around vehicles, a premium has been placed on existing storage space and on ways to add more storage space. Consoles and other interior structures, such as door panels and seats, are now outfitted with cup holders, cell phone holders or cradles, work surfaces for computers, and support surfaces for televisions and VCRs. However, the existing sites for available storage is being quickly consumed and, further, have begun to encroach into the cabin area of vehicles, especially into vans and sports utility vehicles and, in some cases, have resulted in the cab area consuming more of the rear bed, for example, in a pick-up truck or trunk area of other vehicles, leaving little space for storing objects, such as sports equipment, luggage, groceries, or the like.

In addition, there is an ever increasing demand for exterior storage. Some articles are better suited for exterior storage, such as skis, snowboards, home improvement supplies or the like. Such articles have been stored on racks which are mounted to the roof of the vehicle. Some racks are built into the vehicle and other racks are mounted via removable clips on the frame of the window assemblies. With larger vehicles, such as SUVs, this increase in height of the vehicle may limit the vehicle's ability to maneuver in tight spaces, such as a garage. Furthermore, some vehicles are ill suited for racks; therefore, the owner of the vehicle is relegated to renting a truck or the like when he or she wants to haul or carry such items.

Accordingly, there is a need to optimize available storage space of vehicle both inside and outside of the vehicle for storing and locating objects and accessories, such as skis, athletic equipment, luggage, home improvement supplies, and the like. Furthermore, in some instances, there is a need to provide easy access to the objects or work surfaces so that occupants of the vehicle can engage in activities, such as writing, computing, playing games, or the like.

SUMMARY OF THE INVENTION

The present invention provides an automotive glazing system which incorporates mounting members, such as mounting brackets, attached to a window panel for mounting various components, such as shelving, holders, frames, or the like.

In one form of the invention, a vehicular window system comprises a window assembly, which is adapted to mount in an opening of a vehicle body and includes at least one transparent window panel and a mounting member fixedly attached to a surface of the window panel. The window assembly also includes an accessory member, which is attached (and preferably is detachably attached) to the mounting member.

In one aspect, the mounting member is adhered to the window panel. In other aspects, the mounting member is provided at an inner surface of the window panel when the window panel is mounted in a vehicle. In addition, the accessory member may comprise a shelf mounting member.

In yet another aspect, the window panel includes a polymeric member, which attaches the mounting member to the surface of the window panel. In a further aspect, the polymeric member may comprise a molded polymeric member. For example, the mounting member may be offset from the surface of the window panel or contact the surface of the window panel. In other aspects, the mounting member may be adhered to the surface of the window panel.

According to another aspect, the mounting member may be mounted to an outer surface of the window panel when the window panel is mounted in a vehicle. In addition, the attachment member may comprise a mounting bracket, such as a ski holder.

According to another form of the invention, a module for a vehicle body opening includes a vehicle window panel and a compartment. The panel or the compartment is configured and arranged to mount the module in the opening of the vehicle body. The compartment includes a storage space, which provides storage capacity for at least one object whereby the object can be inserted into or removed from said storage space for use by a person when the module is mounted in the vehicle body opening.

In one aspect, the module is adapted to fixedly mount in the opening of the vehicle body and, preferably, is adapted to be releasably mounted in the opening of the vehicle body.

In another aspect, the vehicle window panel comprises a solar panel.

According to other aspects, the storage space is accessible exteriorly of the vehicle. For example, the panel may be pivotally mounted to the compartment to provide exterior access to the storage space. In addition, the storage space includes at least one shelf.

In yet another aspect, the storage space is accessible interiorly of the vehicle when the module is mounted in the vehicle. For example, the compartment may include a door to provide interior access to the storage space. In addition, the panel may comprise two panels, with one of the panels being adapted to be pivotally mounted in the opening whereby the panel may be pivoted to an open position to provide access to the storage space exteriorly of the vehicle. Optionally, both panels may be pivotally mounted in the opening of the vehicle body. In addition, one of the panels may include a work surface.

In yet another form of the invention, a module for mounting in a vehicle includes a support, which is adapted to mount interiorly of the vehicle at or adjacent to a window opening of the vehicle body, and a work surface, which is supported by the support and is positionable between a stowed position recessed in the support and an operative position extended from the frame for access by an occupant of a vehicle.

In one aspect, the support is adapted to be slidably mounted to the interior of the vehicle body whereby the support may be repositioned in the interior of the vehicle.

In another aspect, the work surface is pivotably mounted to the support. Furthermore, the work surface may include at least one storage space for an accessory.

According to another aspect, the support includes a storage space for an accessory.

In yet another aspect, the support includes at least one light assembly for illuminating an interior portion of the vehicle.

The advantages provided by the present invention include a removable storage space which is provided on heretofore generally unused surfaces. In addition, by incorporating mounting members into the vehicle window glazing, the mounting members may be used to mount a variety of different storage components. These and other objects, advantages, purposes, and features of the invention will become more apparent from the study of the following description taken in conjunction with the drawings.

DETAILED DESCRIPTION OF THE PREFERRED EMBODIMENTS

Figures 1, 2:
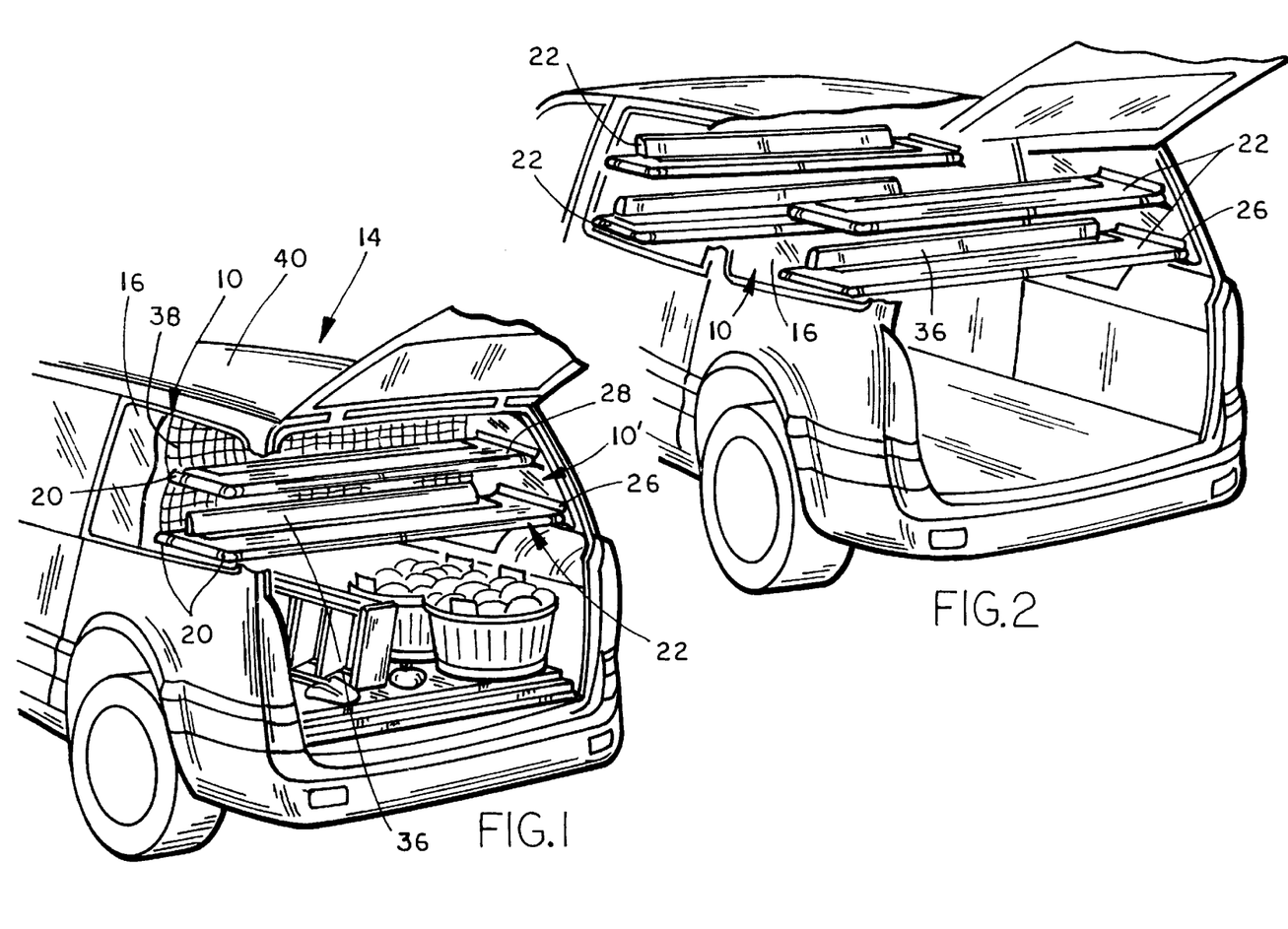
FIG. 1 is a rear perspective view of a vehicle incorporating mounts for shelf brackets into a window vehicle glazing.
FIG. 2 is a similar view to FIG. 1 illustrating multiple shelf brackets incorporated into the window vehicle panels which support a plurality of shelf components.

Referring to FIG. 1, the numeral 10 generally designates a vehicle window system of the present invention. Vehicle window system 10 is adapted to mount in a window opening 12 of a vehicle 14, such as a van, truck, or sports utility vehicle or the like. For example, window system 10 may be flush mounted in window opening 12 by a gasket, including a single-sided gasket, which is formed on an inner surface of vehicle window panel 16, or a two-sided or three-sided gasket, which is formed around a periphery 18 of window panel 16, as is known in the art. It should also be understood that window system 10 may be mounted in vehicle 14 by a frame to which the window panel is mounted, by for example a gasket material, with the frame adapted to mount in the opening of the vehicle. However, the more recent trend in vehicles is to provide a flush mounted window assembly that is mounted to the vehicle by the gasket. Examples of this type of modular window assembly and/or suitable gaskets are shown and described in U.S. Pat. Nos. 4,072,340; 4,139,234; 5,475,956; 5,635,281; 5,853,895; and 6,068,719 and in pending application Ser. No. 09/520,582, filed Mar. 8, 2000 (Attorney Docket DON02 P799), now U.S. Pat. No. 6,319,344, which are incorporated by reference in their entireties.

In the illustrated embodiment, window system 10 comprises a rear side window assembly which includes a window panel 16 that incorporates one or more mounting members 20 that are used to mount storage components, such as shelves 22, as will be more fully described below. Window panel 16 is preferably at least partially transparent and, more preferably, comprises a tinted and/or solar efficient glass window panel and, most preferably, comprises a ceramic or other material black-out or block-out layer, such as is commonly known in the automotive window art for occluding from consumer view an attachment member attaching to an automotive glazing. In this manner, window system 10 provides increased storage space within vehicle 14, especially in the bed of the vehicle. Window panel 16 may be tinted or transparent. It should be understood that window system 10 may comprise a rear window assembly, as well.

Figures 1A, 1B, 15:
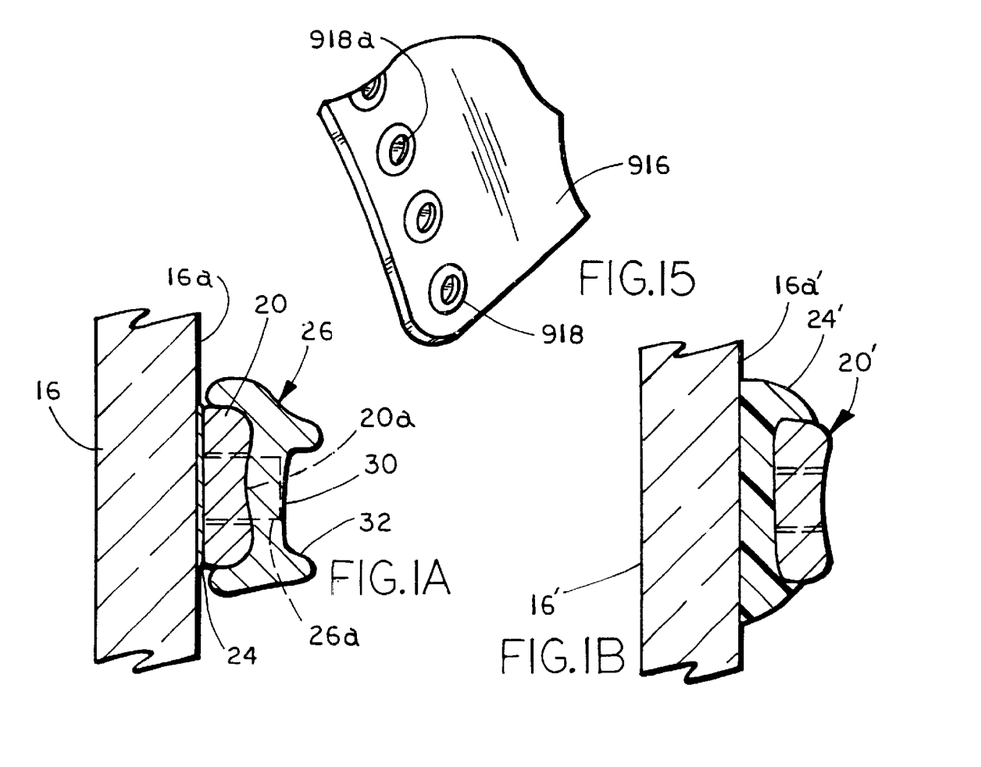
FIG. 1A is a cross-section view taken along line 1A—1A of FIG. 1.
FIG. 1B is a cross-sectional view taken along line 1B—1B of FIG. 1.
FIG. 15 is an enlarged view of the mounting members incorporated into a window panel.

Referring to FIG. 1A, mounting members 20 may be mounted to an inner surface 16a of window panel 16 by a layer of adhesive 24, such as the adhesives described in U.S. Pat. Nos. 5,551,197 or 6,019,411, which are incorporated by reference in their entireties. In this manner, mounting members 20 may be post-attached to window panel 16. Though preferably formed from a glass substrate, window panel 16 may be formed from a plastic substrate, such as polycarbonate, acrylic, or the like, or may comprise a glass polymer laminate, such as a thin glass outer skin, a plastic, such as polycarbonate, acrylic, or the like, as an inner portion, and a further thin glass outer skin.

Referring to FIG. 1B, a second embodiment of window panel 16' is illustrated. Panel 16' incorporates a mounting member 20' which is mounted to inner surface 16a' of window panel 16' by a polymeric member 24', which for example may be molded onto panel 16'. In this manner, mounting member 20' is at least partially encapsulated in polymeric member 24' so that polymeric member 24' at least partially surrounds mounting member 20'. For further details of molding an attachment member in a polymeric member on a window panel, reference is made to U.S. Pat. Nos. 6,120,274; 4,364,214; 5,475,956; 5,614,051; 5,635,281; and 6,086,138, which are incorporated by reference in their entireties. In addition, as shown in FIG. 1B, mounting member 20' may be offset from inner surface 16a' of panel 16'. However, it should be understood, from the cited references, that mounting member 20' may contact the inner surface 16a' of panel 16' and, further, may be adhered to inner surface 16a' of panel 16' by an adhesive to provide direct bonding of mounting member 20' to panel 16'. Although less desirable, it should be understood that mounting member 20' may be mounted by a through bolt or fastener to the window panel.

Referring again to FIGS. 1 and 1A, shelf 22 includes a shelf bracket 26 and a shelf element 28, which provides a support surface 28a. Mounting member 20 is engaged by shelf bracket 26 so tat shelf element 28 can be mounted to panel 16 via mounting member 20. in the illustrated embodiment, mounting member 20 comprises a grommet with a central threaded opening so that shelf brackets 26 may be fastened to mounting members 20 by fastener 26a. Bracket 26 includes a groove 30, which receives shelf element 28 and provides a support surface 32 for shelf element 28. Alternately, mounting member 20 and shelf bracket 26 may be formed as a unitary component, which is either post attached, such as by an adhesive, or molded to window panel, such as by encapsulation, as previously described. However, in the illustrated embodiment, mounting member 20 and bracket 26 are separate components so that mounting member 20 can receive other mounting brackets or holders or the like.

As best seen in FIG. 1, panel 16 includes a plurality of mounting members 20 so that a plurality of shelf elements 28 may be supported between left and right window assemblies 10 and 10' to provide optional increased storage capacity. In addition, one or more shelves 22 may include a vertical wall or flange 36 which provides a guard to restrain objects supported on shelf element 28 from traveling toward the occupants of the vehicle. This flange 36 may be fixed to shelf element 28 or may be pivotably mounted so that it can be selectively moved to its vertical position or returned to a stowed position in which it is generally flush with the support surface 28a. Alternately or in addition, shelves 22 may incorporate a net 38 which may extend between shelf elements 28 and, further, may extend to roof portion 40 of vehicle 14 to provide substantially full containment of larger objects supported on shelf elements 28.

In addition, referring to FIG. 2, in larger vehicles more than one pair of window assemblies may incorporate mounting members so that more than two shelves may be mounted in vehicle 14. Optionally, each window panel 16 may incorporate vertically and horizontally spaced mounting members to provide greater adjustability to the locations of the respective shelf elements 28.

Figures 3, 4:
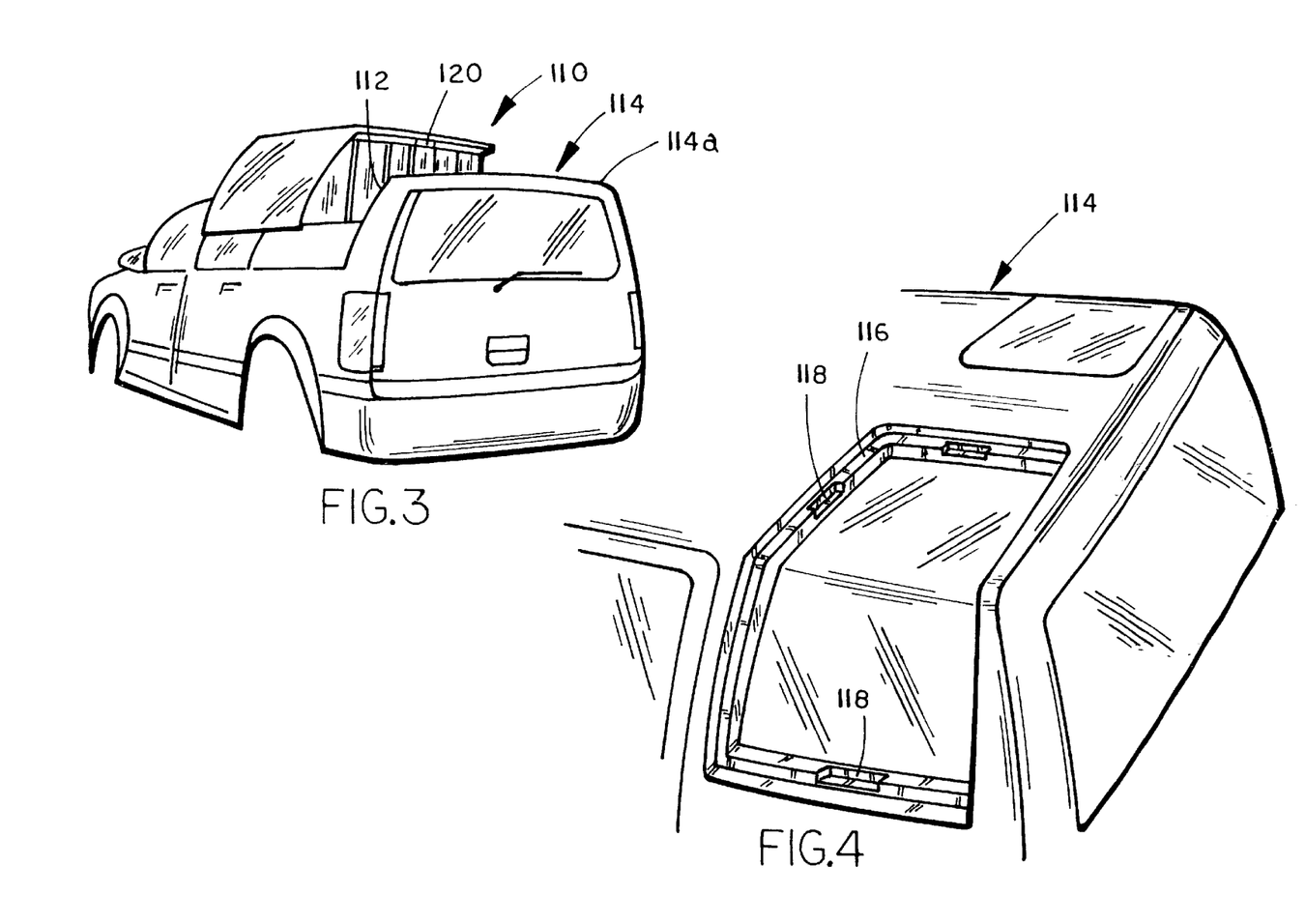
FIG. 3 is a rear perspective view of a vehicle incorporating a module into a window opening.
FIG. 4 is a perspective view of the window opening of FIG. 3 with the module removed.

Referring to FIG. 3, the numeral 110 generally designates a module of the present invention which is adapted to mount in an opening 112 of a vehicle 114. Similar to the previous embodiment, module 110 is provided to increase the storage capacity for vehicle 114 and, further, optionally in a manner to permit substitution with other modules that will be more fully described below.

Module 110 is adapted to mount in opening 112 and rests on a perimeter mounting flange 116, which is recessed below the outer surface of the vehicle body so that when module 110 is installed, it will generally follow the contours of the vehicle body. In the illustrated embodiment, mounting flange 116 includes a plurality of latching surfaces 118 to which a corresponding plurality of latches 120, which are provided on module 110, engage to thereby fixedly mount module 110 in opening 112. Preferably, latches 120 provide a releasable engagement of latching surfaces 118 so that module 110 can be removed and replaced with a different module, as will be fully described in reference to FIGS. 6–8.

Figures 5, 6, 7:
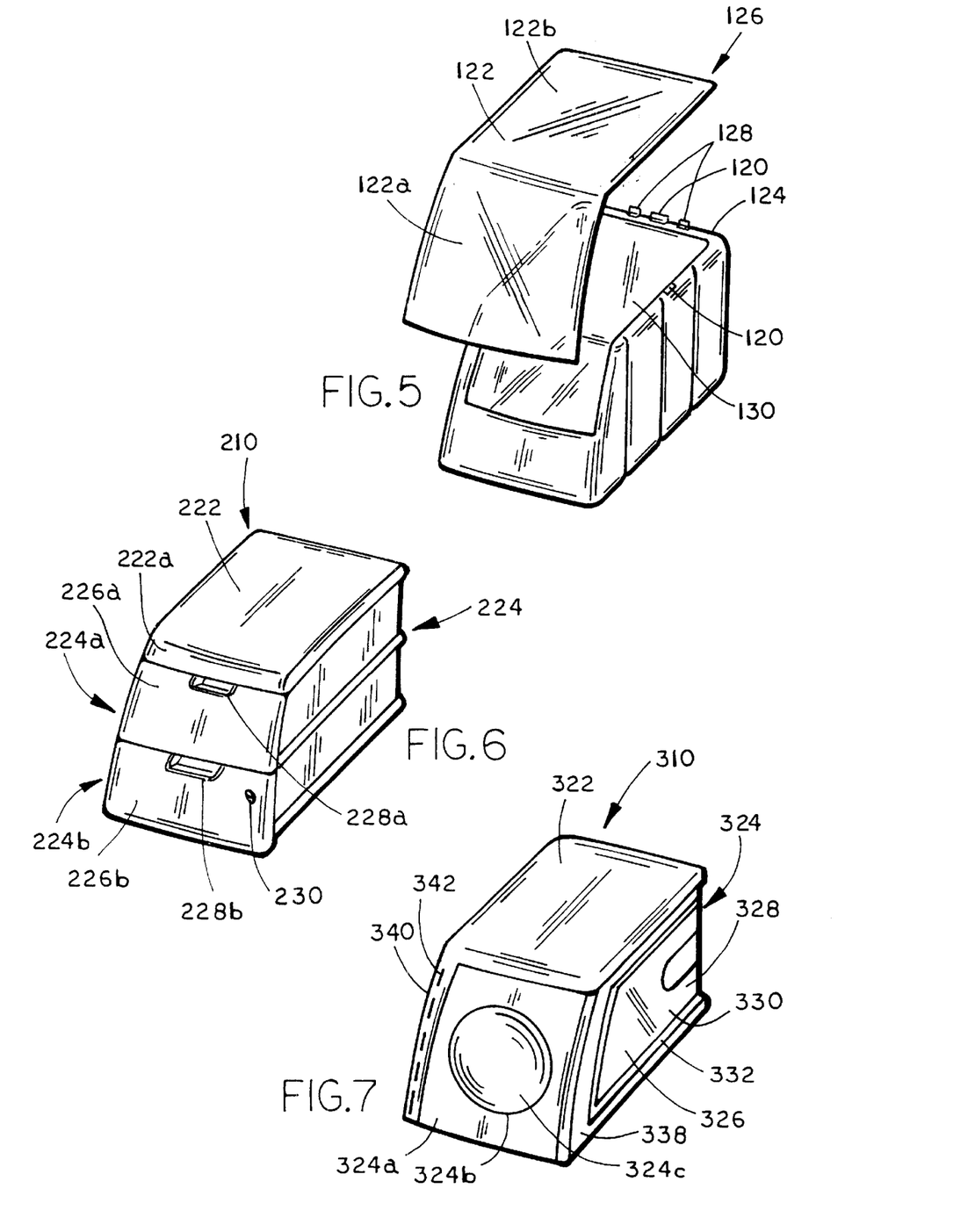
FIG. 5 is an exploded perspective view of the module of FIG. 3 with a large storage compartment.
FIG. 6 is a perspective view of a second embodiment of the module incorporating a plurality of drawers.
FIG. 7 is a perspective view of a pet storage module.

Referring to FIG. 5, module 110 includes a panel 122 which is formed to at least generally follow the contour of the vehicle body. Panel 122 may comprise a vehicle window panel or a body panel, as will be more fully described below. In addition, module 110 includes a storage base or compartment 124, which together with panel 122, forms a container 126 that provides a storage space 130 for holding one or more objects, such as sports equipment, dry food, blankets, tools, picnic basket, or the like, for storage. It should be understood that this list of objects is not exhaustive and is exemplary only. In addition, base 124 may comprise an insulated base so that container 126 can be used to store perishable food. In one form, panel 122 is pivotally mounted in the opening of the vehicle. For example, panel 122 may be pivotably mounted to base 124 by hinges 128 so that access to the storage space 130 defined in base 124 may be available exteriorly of the vehicle when module 110 is positioned in vehicle 114. Alternately, panel 122 may be mounted to base 124 (or to the vehicle body) by a plurality of releasable latches such that panel 122 may be completely removed from base 124 to provide a larger access opening to storage space 130.

Base 124 is preferably formed from a molded plastic material, such as polypropylene, ABS, polyethylene, acrylic, polycarbonate, nylon or similar moldable polymer. Panel 122 may comprise a plastic panel, including a clear or tinted plastic panel, such as a polycarbonate, acrylic or the like. Furthermore, panel 122 may be tinted to match or complement the vehicle body to simulate a vehicle body panel. Alternately, panel 122 may comprise a glass panel, including a clear or tinted glass panel, in which case panel 122 would simulate a vehicle window panel. In addition, panel 122 may comprise a glass polymer laminate, such as a thin glass outer skin, a plastic, such as polycarbonate, acrylic, or the like, as an inner portion, and a further thin glass outer skin, or a metal panel.

Referring again to FIG. 5, panel 122 includes a lower panel portion 122a, which extends down the side of the vehicle when module 110 is mounted in vehicle 114, and an upper panel portion 122b, which extends inwardly from lower panel portion 122a along the roof portion 114a of vehicle 114. Panel portions 122a and 122b may be formed from the same material; however, it is also contemplated that upper panel portion 122b may be formed from a solid plastic panel or metal and may further be coated or formed to generally match the body of the vehicle, while panel 122a may, as noted previously, comprise a clear or tinted plastic or clear or tinted glass panel to simulate a window panel. It should be understood, however, that both panel portions 122a and 122b may be adapted to match the color of the vehicle body or be tinted or left clear to match the other windows in the vehicle to simulate a window.

As previously noted, mounting flange 116 includes a plurality of latching surfaces 118; however, it can be appreciated, that mounting flange 116 may include a plurality of latch mechanisms for engaging a corresponding plurality of latching surfaces provided on module 110. Furthermore, it is also contemplated that panel 122 may comprise a window panel, with the corresponding latching surfaces or latching members provided on its perimeter for engaging mounting flange 116, and with base 124 including a plurality of releasable latch mechanisms for engaging panel 122. In this manner, module 110 may be adapted to provide a storage space and, further, adapted to provide a fully functional window panel when base 124 is disengaged from panel 122 and removed from vehicle 114.

Referring to FIG. 6, a second embodiment 210 of the module of the present invention is shown. Module 210 includes a panel 222 and a storage base or compartment 224. In the illustrated embodiment, base 224 comprises a pair of drawer units 224a and 224b which are interconnected and together mount to panel 222, for example, by a plurality of latches (not shown). Each drawer unit 224a and 224b includes a face plate or panels 226a and 226b, respectively, which generally align so that when module 210 is positioned in opening 112 of vehicle 114, face plates 226a and 226b are generally aligned with the body of vehicle 114 similar to panel portion 122a. Furthermore, face plates 226a and 226b generally align with outer edge 222a of panel 222 and together with panel 222 have a similar profile to panel 122. Each face plate 226a and 226b optionally includes a handle 228a and 228b so that the drawers of each drawer unit 224a, 224b may be accessed exteriorly of the vehicle to store or retrieve objects in the storage space therein. Optionally, one or more drawer units may include a lock 230 to provide a secure storage unit. Similar to the previous embodiment, panel 222 may comprise a plastic panel, including a clear plastic panel or an opaque or tinted plastic panel, or a glass panel, which may also be transparent or tinted, or a metal or fiberglass panel, or a glass/polymer laminate. In addition, panel 222 and face plates 226a and 226b may comprise metal panels which are painted or otherwise treated to match the body of the vehicle, similar to panels 22 and 122. Face plates 226a and 226b optionally comprise a similar material to panel 222 to provide a more aesthetic module so that module 210 at least generally matches the styling of vehicle 114, as previously described in reference to panel 122.

Referring to FIG. 7, module 310 comprises an animal storage unit. Module 310 includes a panel 322 and an animal storage base or compartment 324. Similar to the previous embodiments, panel 322 may comprise a plastic panel, including a clear plastic or tinted plastic, a glass panel, a metal or fiberglass panel, or a glass/polymer laminate. Base 324 together with panel 322 forms a container 326 in which an animal can be placed for safekeeping when traveling. Base 324 includes a front panel portion 324a with an opening 324b in which a window or screen 324c is positioned so that the pet contained in storage space 326 may be viewed exteriorly of the vehicle. In addition, window or screen 324c may be adapted to open to provide access to the animal exteriorly of the vehicle. Furthermore, base 324 optionally includes a door or movable panel 328 to permit access in the vehicle to the pet through the side of base 324. For example, door 328 may comprise a sliding panel 330, which is slidably mounted in a frame 332 formed on sidewall 338 of base 324. In the illustrated embodiment, side panel 324a comprises a solid side panel; however, it can be appreciated that panel 324a may similarly comprise a clear plastic or glass panel, which would eliminate the need for window 324c.

In the illustrated, panel 322 includes a downwardly depending portion 340 which extends interiorly of the vehicle and which defines a frame in which a screen or perforated member 342 is positioned to provide air flow to the pet inside container 326. In this manner, module 310 provides a ventilated pet carrier which once placed in vehicle 114 may be accessed from the interior of the vehicle and optionally exteriorly of the vehicle. Panel 322 may include a handle or gripping surface, such that when module 310 is removed from vehicle 114, it may be used as a pet carrier independent of the vehicle. It can be appreciated that module 310 may be modified in a number of different ways. For example, panel 322 may be formed from a clear plastic or a tinted plastic or a glass panel, as described in reference to the previous embodiments of the modules. However, in order to make module 310 portable, which provides a dual function of providing a built-in pet carrier for the vehicle as well as a portable pet carrier, it would be preferred to form both panel 322 and base 324 from a light weight material, such as plastic.

Figure 8:
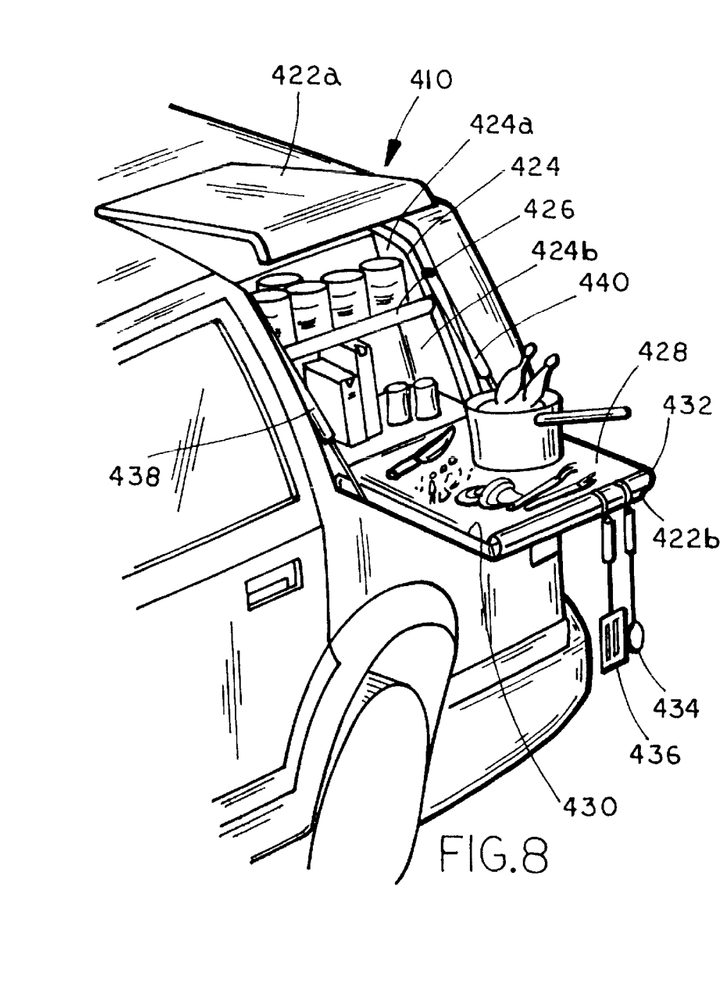
FIG. 8 is a perspective view of another embodiment of the storage module of the present invention incorporating a work space and storage space accessible exteriorly of the vehicle.

Referring to FIG. 8, another embodiment 410 of the module of the present invention is illustrated. Module 410 includes an upper panel member 422a and a lower panel member 422b and a storage base or compartment 424. Base 424 includes an upper storage area 424a and a lower storage area 424b, with upper storage area 424a provided by a shelf element 426. In the illustrated embodiment, base 424 provides storage space for objects, such as food or cooking utensils. Upper panel member 422a is pivotably mounted to base 426 to provide access to storage spaces 424a and 424b. Similarly, panel 422b is pivotably mounted to base 424 to provide access but, further, to provide a work surface 428 which is formed on or attached to inwardly facing surface 430 of lower panel 422b. Work surface 428 may comprise a cutting surface or may incorporate on or more heating elements to provide a cooking surface or both. Furthermore, work surface 428 may incorporate a tool bar 432 for mounting one or more cooking tools 434 and 436.

In the illustrated embodiment, panel 422b is pivotably mounted to base 424 by a pair of cylinders 438 and 440. Preferably, cylinders 438 and 440 include a positioning device to thereby fix the position of panel 422b when panel 422b is moved to its open or operative position, such as illustrated in FIG. 8, to provide a more stable work surface.

Similar to the panels of the previous embodiments, panels 422a and 422b preferably at least generally match the contour of the body of the vehicle when panels 422a and 422b are closed. In addition, each panel 422a, 422b may comprise a plastic panel, including a transparent or tinted plastic panel, or a glass panel, including a clear glass panel or a tinted glass panel, or a metal or fiberglass panel, or a glass/polymer laminate. Therefore, when panels 422a and 422b are moved to their closed position, panel 422a and 422b may simulate a window or may at least generally match the body of the vehicle. Furthermore, as previously noted, panels 422a and 422b may be coated or painted to generally match the color of the vehicle body.

Figure 9:
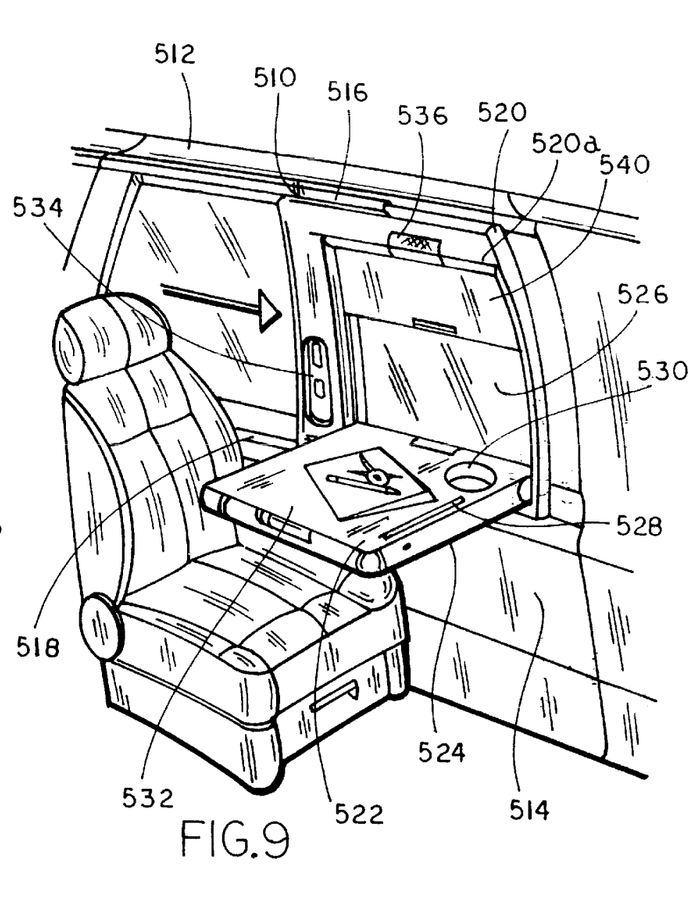
FIG. 9 is a perspective view of an interior module which includes a storage space and which incorporates a plurality of accessories.

Referring to FIG. 9, an interior module 510 of the present invention is illustrated. Interior module 510 is adapted to mount between roof or ceiling 512 of a vehicle and an interior side panel 514 of a vehicle. In the illustrated embodiment, module 510 is mounted on a pair of rails 516 and 518 which permit module 510 to slide and move between a plurality of positions along the interior side of the vehicle. For example, in larger vehicles, such as SUVs, which have more than one row of back seats, module 510 can, therefore, be moved between a first position where the module is accessible by occupants of the first row of seats to a second position wherein the module is accessible by occupants of the second row of seats.

As best seen in FIG. 9, module 510 includes a support 520, such as a frame, which slidably engages rails 516 and 518. Support 520 supports a work surface 522, which is formed on a panel 524. Panel 524 is movable between an operative position in which panel is extended from support 520 (as shown in FIG. 9) and a stowed position, in which panel 524 is recessed within support 520. In the illustrated embodiment, panel 524 is pivotably mounted to support 520. In addition, support 520 optionally includes an opening 526 in which panel 524 is pivotably mounted and, further, to which panel 524 pivots when panel 524 is moved to its stowed position. Opening 526 is preferably aligned with a window so that when panel 524 is pivoted to its operative position, an occupant of the vehicle can see exteriorly of the vehicle through the opening.

Work surface 522 may incorporate one or more storage spaces 528 and 530, which form, for example, pencil holders or cup holders. In addition, panel 524 may include a hinged panel element 532, which defines work surface 522, whereby additional storage space may be provided in panel 524, which is accessible through hinge panel 532.

Support 520 may also provide storage space, for example, for an accessory 534, such as a phone, hand held computer, calculator, or the like. Furthermore, support 520 may incorporate one or more lights 536 for illuminating, for example, work surface 522. In addition, lights 536 may provide a reading light. Moreover, support 520 may incorporate one or more accessories, such as a display or video screen, such as described in copending application entitled VIDEO MIRROR SYSTEMS INCORPORATING AN ACCESSORY MODULE, Ser. No. 09/793,002, filed Feb. 26, 2001 (Attorney Docket No. DON01 P-869), which is incorporated herein by reference in its entirety. Other accessories which may be incorporated into support 520 include a Kleenex dispenser, a pencil holder, a flash light module, or the like. For further description of other accessories that may be incorporated into support 520, reference is made herein to U.S. Pat. application entitled REARVIEW MIRROR ASSEMBLY WITH UTILITY FUNCTIONS, Ser. No. 09/449,121, filed Nov. 24, 1999 (Attorney Docket No. DON01 P-778), now U.S. Pat. No. 6,428,172, which is incorporated herein by reference in its entirety.

Furthermore, support 520 may support a shade 540. For example, shade 540 may be coiled in the upper portion 520a of support 520 on a retractable roller so that shade 540 may be extended to a plurality of desired positions and, further, retracted into upper portion 520a when shade 540 is no longer needed. Alternately, support 520 may support a conventional blind.

Figure 10:
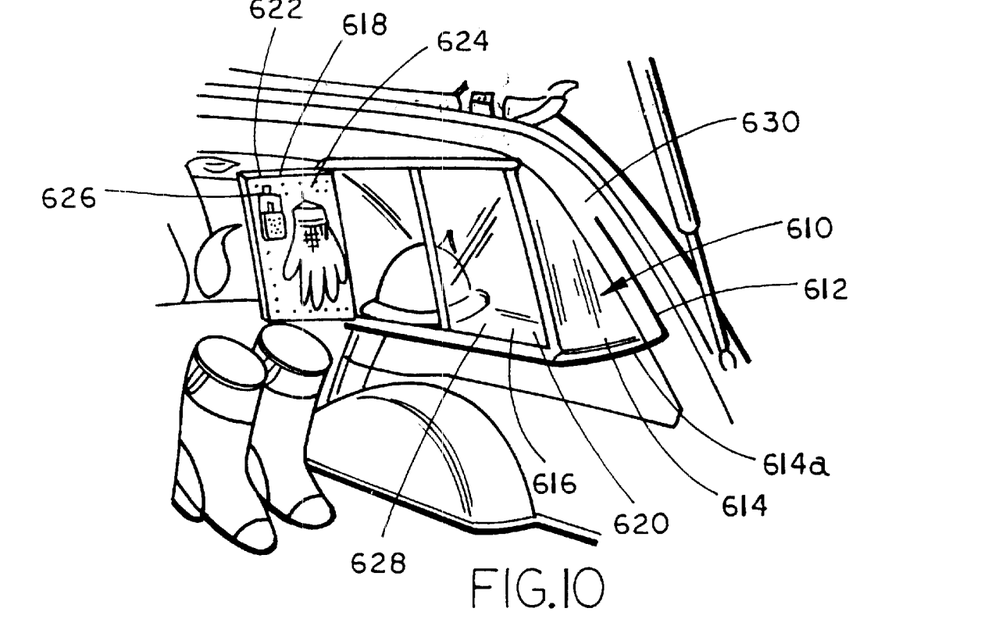
FIG. 10 is a perspective view of a multi-purpose storage module which is incorporated into a rear window opening of a vehicle.

Referring to FIG. 10, another embodiment 610 of an interior module of the present invention is illustrated. Similar to the previous embodiments, module 610 is adapted to mount in a window opening of a vehicle. Module 610 includes a panel 612, similar to the panels described in reference to the previous embodiment, and a storage base or compartment 614. Optionally, base 614 may comprise an open frame, which secures to panel 612. In this manner, module 610 may permit light to pass through panel 612 similar to a window assembly. Storage space 616 comprises a support surface 620, which is provided by bottom wall 614a of base 614. Base 614 may also include additional storage space 618, which is provided by a door or panel 622. It should be understood that intermediate shelving may be provided in base 614 similar to module 410. In the illustrated embodiment, storage space 618 is formed by a peg board 624, which is mounted to or comprises door 620 and which is adapted to receive one or more hooks 626 or other holders or supports so that objects, such as gloves, telephones, locks, tools, or the like may be hung from peg board 624.

Door 622 is preferably pivotably mounted to base 614 to define a closed storage within base 614. In addition, door 622 may comprise a bi-fold door so that the entire rearward opening 628 of base 614 may be closed when door 622 is moved to its closed position.

As noted in reference to the previous embodiments, panel 612 may comprise a plastic panel, including a clear plastic panel or a tinted plastic panel, or a glass panel, including a clear glass panel or a tinted glass panel. In addition, as previously described, panel 612 may comprise a metal or fiberglass panel, which is painted or coated so that it matches the body of the vehicle, or a glass/polymer laminate. Preferably, module 610 is releasably mounted in opening 630 of the vehicle so that it may be replaced with other modules as needed or as desired.

Figure 11:
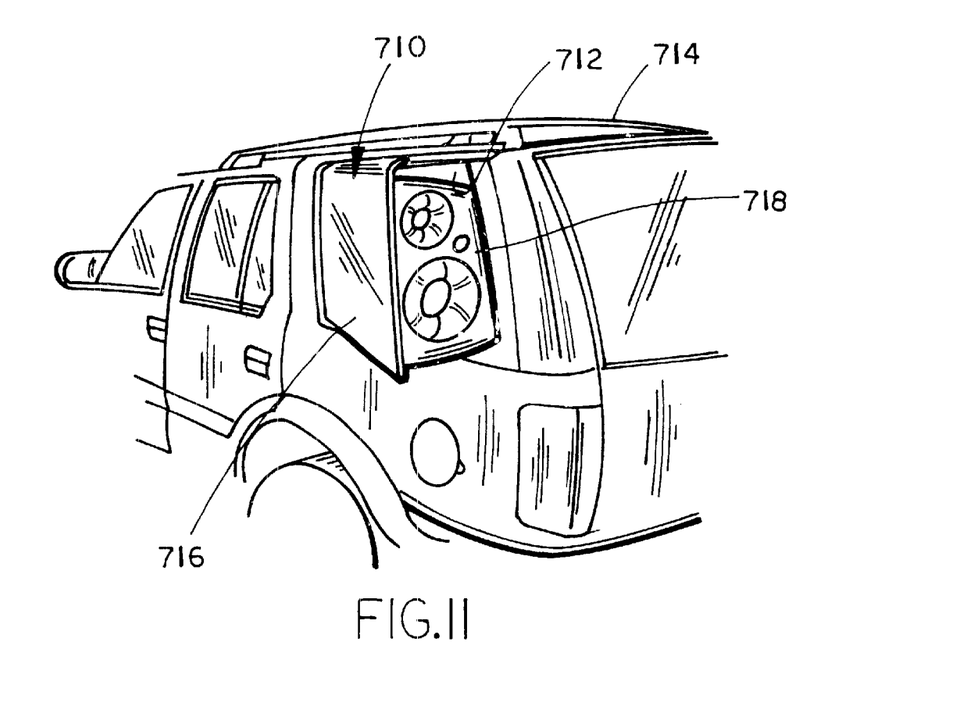
FIG. 11 is a perspective view of another module which is pivotally mounted to rear window opening of a vehicle, which incorporates an entertainment component.

Another embodiment 710 of the module of the present invention is illustrated in FIG. 11. Module 710 is similarly adapted to mount in opening 712 of vehicle 714 and may be interchangeable with module 610. In the illustrated embodiment, module 710 is pivotably mounted in opening 712 and includes a panel 716 and an entertainment device 718, such as a speaker, a display screen, such as a video screen, or the like. As described in reference to the previous embodiments, panel 716 may comprise a plastic, glass, metal, or fiberglass panel and may be tinted, painted, or coated to simulate either a window or to match the body of the vehicle. In addition, panel 716 may comprise a glass/polymer laminate. Entertainment device 718 is mounted to panel 716 and moves with panel 716 when panel 716 is pivoted from a stowed position, in which the entertainment device is positioned interiorly of the vehicle, and an operative position in which the entertainment device 718 is useable exteriorly of the vehicle. In this manner, when module 710 is pivoted outwardly, people outside the vehicle may enjoy the benefits of the entertainment device 718 exteriorly of the vehicle, such as at a picnic, block party, or a tailgate party or the like.

Figure 12:
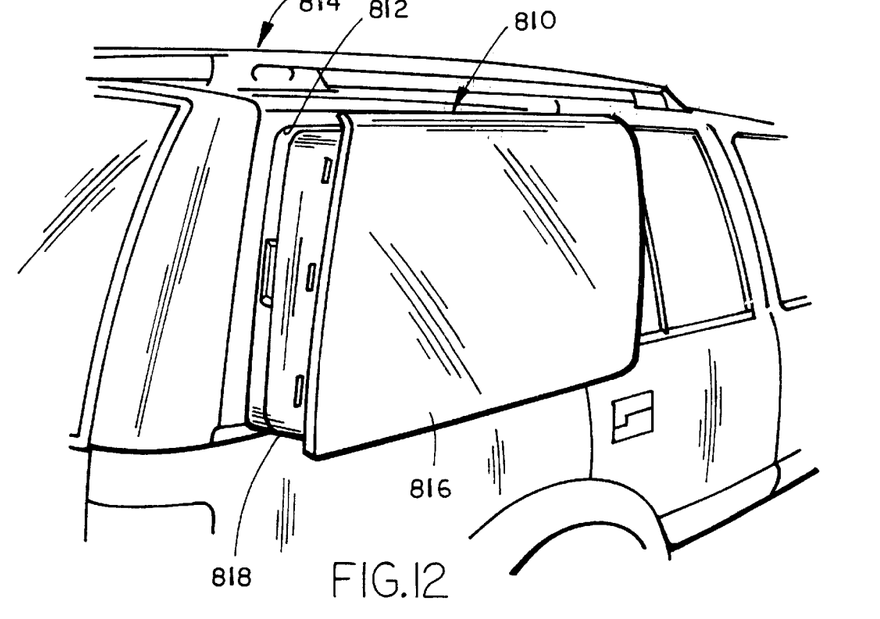
FIG. 12 illustrates yet another embodiment of a module incorporated into a rear window opening of a vehicle which includes one or more solar panels for an alternative power resource.

Referring to FIG. 12, another embodiment of the module 810 of the present invention is illustrated. Module 810 may be similarly interchangeable with module 610 or 710 being adapted to mount in a rearward window opening 812 of a vehicle 814. Module 810 includes a panel 816 and a storage base or compartment 818. Panel 816 is adapted to generally follow the contour of the vehicle body and includes one or more solar panels. Base 818 houses the circuitry for panel 816 to convert the solar energy into electrical energy suitable for use in the vehicle or exteriorly of the vehicle and optionally may incorporate storage space, similar to module 610. For example, the solar panel or panels may be used to power one or more accessories located in the vehicle, including for example a television, a VCR, a computer, or the like, or may be used to power an external accessory, such as a stereo, TV, or the like, such as at a picnic, block party, a tailgate party, or the like.

Figure 13:
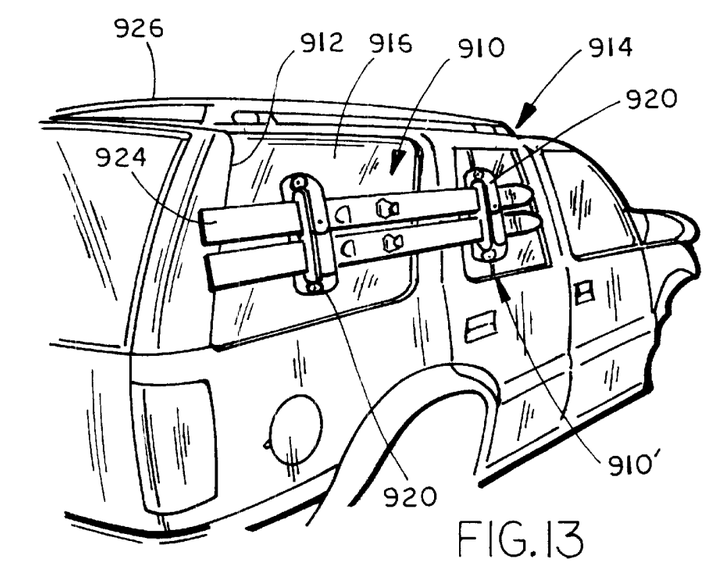
FIG. 13 is another embodiment of a vehicle window glazing incorporating mounting members, which in an illustrated embodiment provide mounting surfaces for ski holders.
Figure 14:
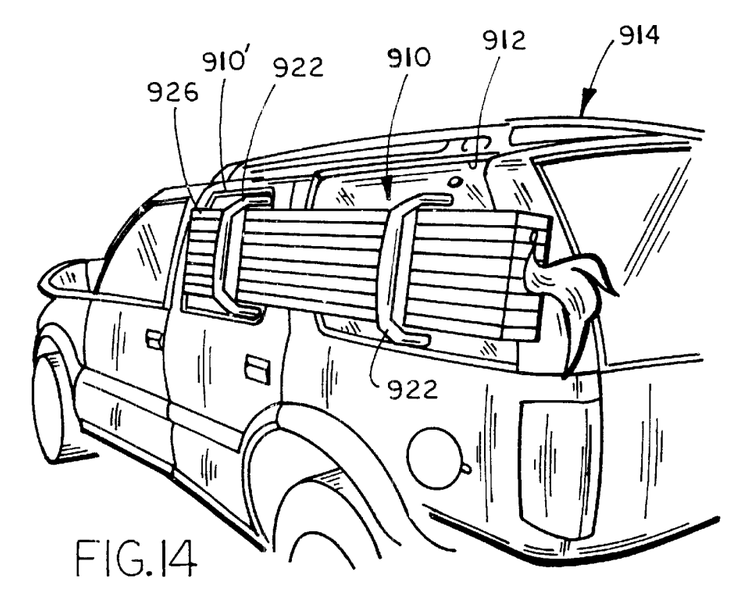
FIG. 14 is another embodiment of a holder which may be mounted to the mounting members of FIG. 13.

Referring to FIGS. 13–15, another embodiment 910 of a window assembly of the present invention is illustrated. Window assembly 910 is adapted to be mounted in a window opening 912 of a vehicle 914. For example, as previously noted in reference to the first embodiment, window assembly 910 may be flush mounted in opening 912 of vehicle 914, such as by a gasket, including a one-sided, two-sided, or three-sided gasket. Though less preferred, window assembly 910 may be mounted in opening 912 by a metal frame, as is known in the art.

Window assembly 910 includes a window panel 916 that incorporates a plurality of mounting members 918 (FIG. 15). Mounting members 918 are mounted at window panel 916 in a similar manner to mounting members 20 or 20' as described in reference to the first embodiment. Mounting members 918 are adapted to be engaged by holders 920 (see FIG. 13) or holders 922 (see FIG. 14). For example, mounting members 918 may include threaded openings 918a, which can receive fasteners to secure holders 920 or 922.

In the illustrated embodiment, holders 920 comprise ski holders and are adapted to releasably engage mounting members 918 so that skis 924 can be mounted to the side of the vehicle 914 to either free up the roof portion 926 for storage of other items or objects or to reduce the overall height of vehicle 914.

Holders 922 are similarly adapted to engage mounting members 918 and, in the illustrated embodiment, comprise holders for rectangular objects, such as wood beam members 926. It should be understood that holders 920 or 922 may be universal holders which are capable of holding a variety of different shaped components. Preferably, window assemblies 910, 910' include a plurality of vertically spaced mounting members 918 so that the position of, for example, holders 920 can be adjusted and, further, to accommodate larger or smaller holders 922.

Accordingly, the present invention provides window assemblies or window modules which provide increased storage capacity for the vehicle. In addition, the increased storage capacity can be post-assembled or post-attached so that existing vehicles may be provided with such a system. Optionally, these features may be incorporated during the assembly process; however, this is not required. In addition, modular frame of the present invention permits interchanging of modules and, further, provides the customer with the option to custom modify his vehicle.

It can be appreciated that while reference is made to window openings in reference to the insert modules of the present invention, customized openings may be used. Furthermore, the size and shape of these modules may be varied as desired. In addition, a vehicle may incorporate more than one module.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

We claim:

1. A vehicular window system comprising:
   a vehicular window assembly comprising at least one window panel, said window assembly adapted to mount in an opening of a vehicle body;
   a molded polymeric member bonded onto one side of said panel;
   a mounting member fixedly attached to said side of said window panel by said polymeric member, said mounting member at least partially encapsulated in said polymeric member; and
   an attachment member attached to said mounting member, said attachment member providing at least one of a holding surface and an attachment surface for mounting a storage component to the vehicular window assembly.

2. The vehicle window system according to claim 1, wherein said mounting member is adhered to said window panel.

3. The vehicle window system according to claim 1, wherein said mounting member is provided at an inner side of said window panel when said window panel is mounted in a vehicle.

4. The vehicle window system according to claim 3, wherein said attachment member comprises a shelf mounting member.

5. The vehicle window system according to claim 1, wherein said mounting member comprises a plurality of mounting members.

6. The vehicular window system according to claim 1, wherein and said polymeric member attaches said mounting member to an exterior side of said window panel.

7. The vehicular window system according to claim 6, wherein said polymeric member comprises a molded polymeric member, said molded polymeric member molded onto said exterior side of said panel.

8. The vehicular window system according to claim 6, wherein said window panel comprises a glass panel.

9. The vehicular window system according to claim 6, wherein said polymeric member at least partially surrounds said mounting member.

10. The vehicular window system according to claim 6, wherein said mounting member is offset from said exterior side of said window panel.

11. The vehicular window system according to claim 6, wherein said mounting member contacts said exterior side of said window panel.

12. The vehicular window system according to claim 6, wherein said mounting member is adhered to said exterior side of said window panel.

13. The vehicular window system according to claim 1, wherein said mounting member is mounted to an exterior side of said window panel when said window panel is mounted in a vehicle.

14. The vehicular window system according to claim 13, wherein said attachment member comprises a holder.

15. The vehicular window system according to claim 14, wherein said holder comprises a ski holder.

* * * * *

UNITED STATES PATENT AND TRADEMARK OFFICE
CERTIFICATE OF CORRECTION

PATENT NO. : 6,672,637 B2 Page 1 of 1
APPLICATION NO. : 10/106155
DATED : January 6, 2004
INVENTOR(S) : Barry W. Hutzel It is certified that error appears in the above-identified patent and that said Letters Patent is hereby corrected as shown below:

Column 4:
Line 61, "he" should be --be--

Column 5:
Line 4, "tat" should be --that--

Column 12:
Line 18, Claim 6, Delete "and" after "wherein"

Signed and Sealed this

Thirtieth Day of January, 2007

JON W. DUDAS
*Director of the United States Patent and Trademark Office*